United States Patent Office 2,980,507
Patented Apr. 18, 1961

2,980,507

PROCESS FOR PREPARING ZIRCONIUM OXIDE

Gerd Rossmy, Essen, Germany, assignor to Th. Goldschmidt A.G., Essen, Germany, a company of Germany No Drawing. Filed Sept. 30, 1957, Ser. No. 686,891

6 Claims. (Cl. 23—140)

In broad outline this invention pertains to a process for reacting zirconium tetrachloride with certain organic compounds so as to either (1) directly form zirconium copound polymers containing chlorine and alkoxy groups, or (2) first form an intermediate reaction product which can thereafter be thermally decomposed to produce alkylchloride as well as zirconium compound polymers containing chlorine and alkoxy groups—depending upon the particular reaction conditions which are employed. According to the preferred embodiment of this invention a process of the above nature is carried out by reacting zirconium tetrachloride with certain aliphatic ethers.

More specifically, one embodiment of this invention pertains to the reaction of zirconium tetrachloride with aliphatic ethers containing between 2 and 6 carbon atoms. Dimethyl ether ($CH_3OCH_3$) is the preferred aliphatic ether, but diethyl ether, diisopropyl ether, dipropyl ether, etc., may also be used. The mixed aliphatic ethers such as methyl ethyl ether, methyl propyl ether, methyl butyl ether, methyl amyl ether, ethyl butyl ether, ethyl propyl ether, etc., may also be used.

The reaction between zirconium tetrachloride and an aliphatic ether can be carried out by contacting solid zirconium tetrachloride, at a temperature below its sublimation point (331° C.), with the aliphatic ether while the ether is in gaseous or vapor form. However, better yields are usually obtained if an intermediate reaction product (having the formula $ZrCl_4.2ROR'$) is first prepared by reacting zirconium tetrachloride and an aliphatic ether at room temperature or at only slightly elevated temperatures and thereafter thermally decomposing this intermediate reaction product at temperatures ranging between about 130 and 400° C. to form the zirconium compound polymers having chlorine and alkoxy groups. (In the foregoing formula R and R′ may represent either the same or different alkyl groups.)

The reaction of an aliphatic ether with zirconium tetrachloride may also be performed with advantage in an autoclave. The reaction can be performed at a temperature either above or below the critical temperature of the aliphatic ether. It is also possible to work up to a certain temperature (e.g. 80° to 160° C.) in an autoclave under the natural pressure of the reaction products (e.g. up to 100 atmospheres) and then to complete the reaction at rising temperatures (e.g. 300° C.) and at lower pressures or even atmospheric pressure. The temperature rise principally accelerates the reaction and leads to the formation of zirconium compound polymers which are relatively poor in chlorine and alkoxy groups. Higher pressures chiefly favour improved yields of the alkyl chloride.

The properties of the complex zirconium oxide addition product may depend not only on the particular aliphatic ether employed, but also upon the decomposition conditions. For example in the case where dimethyl ether is used as the aliphatic ether and an intermediate reaction product is formed, a comparatively low decomposition temperature of between about 130° C. and 160° C. and a reaction time of between about 25 and 45 hours will result in the formation of a water-soluble product which is quite similar to the compound $ZrOCl_2$, but which, in addition to chlorine groups also contains some alkoxy groups. On the other hand, if the decomposition of such an intermediate reaction product is carried out at a higher temperature, say between 200 and 280° C., a complex product results which is in the form of a water-insoluble powder containing only a few chlorine and alkoxy groups and in general having properties more closely resembling zirconium dioxide. This latter complex zirconium oxide addition product can readily be transformed into pure zirconium dioxide by treating it with steam (300–500° C.) followed by calcination (below 1000° C.).

It is thus seen that the overall process of this invention is primarily characterized by its great versatility. By varying the reactants, temperatures, pressures and reaction times, a wide variety of different types of intermediate reaction products and final zirconium compound polymers may be obtained.

The water-soluble zirconium compound polymers resulting from the decomposition of said addition compounds and being similar to the composition of the up to now unknown compound $ZrOCl_2$ can be used for various applications where usually aqueous zirconium oxychloride ($ZrOCl_2.8H_2O$) has been applied. An important advantage of the present invention is the following: when producing these compounds no hydrogen chloride is formed; but all the chlorine being substituted during reaction is used for the formation of valuable alkyl chlorides. Furthermore the above zirconium compounds, closely corresponding to $ZrOCl_2$, may be used as curing- or polymerization-accelerators for the production of varnishes, resins, and the like, e.g. of silicones. The water-insoluble compound polymers resulting from the decompositions at higher temperatures can be used right off, e.g. as fillers for plastic materials. However, as will be evident from the examples these compounds can easily be converted into pure zirconium dioxide too, which for example is widely used in the ceramic industry. It is a special advantage of the present invention that nearly all the chlorine of $ZrCl_4$ is used for the production of valuable alkyl chlorides (up to 90%) instead of liberating hydrogen chloride as it is the case in the usual methods of producing zirconium oxide.

Although it has been found that the zirconium compound polymers of this invention are apparently not susceptible to an exact definition in terms of a chemical formula, it is believed that the fact that the zirconium compound polymers are known to contain varying amounts of chlorine and alkoxy groups (depending on the exact method of preparation) and the herein described details as to the procedures which may be followed in producing these compounds, will be sufficient to enable those skilled in this general field to easily prepare products of the desired nature with either no experimentation at all or with the minimum amount of routine experimentation.

Having generally described the invention, the following specific examples are given to aid in understanding the invention. These examples are merely illustrative and are not to be construed as limiting the underlying principles of the invention.

*Example 1*

A solid compound having the general formula $ZrCl_4.2CH_3OCH_3$ was prepared by reacting solid zirconium tetrachloride and dimethyl ether at approximately 30° C. 325 parts by weight of this compound were decomposed in the course of about 3 hours by heating to about 300° C. The dimethyl ether resulting from the decomposition of the said compound was separated from the methyl chloride and a yield of 145 parts by weight of pure methyl chloride was thus obtained. The residue consisted of zirconium compound polymers containing 58.5% Zr, 25% Cl and 2% C as methoxyl groups and which were insoluble in water. By treating the residue with steam at about 300 to 500° C. followed by calcination at temperatures up to about 1000° C. it was found that the residue could be transformed into highly pure zirconium oxide.

*Example 2*

325 parts by weight of the starting compound mentioned in Example 1 was heated for about 35 hours at between about 140 and 150° C. until no further gas was evolved. After separating the dimethyl ether a yield of approximately 50% methyl chloride (in relation to the dimethyl ether introduced) was obtained. The solid residue was readily soluble in water. It consisted of zirconium compound polymers which contained about 2 atoms of chlorine for each atom of zirconium and 17% C in the form of $OCH_3-$ groups. It could be converted into pure zirconium oxide in the manner described in Example 1 (steam and calcination at 700 to 900° C.).

*Example 3*

233 parts by weight of pure zirconium tetrachloride and 92 parts by weight of dimethyl ether were reacted in an autoclave at temperatures up to about 130° C. and at a pressure up to about 50 atmospheres. The pressure was then reduced to about 8 atmospheres and the temperature raised to roughly 300° C. After elimination of the dimethyl ether 172 parts by weight of methyl chloride (80% of the theoretical amount) was recovered. The solid product was converted into 123 parts by weight of zirconium oxide in the manner described in Example 1 (steam at 300 to 500° C., calcination 800–1000° C.).

*Example 4*

233 parts by weight of pure zirconium tetrachloride were reacted with 100 parts by weight of dimethyl ether in an autoclave at temperatures of about 210° C. and at a pressure of about 120 atmospheres. 200 parts by weight of methyl chloride (91% yield in relation to the dimethyl ether introduced) and a solid residue were obtained. The zirconium compound polymers were converted quantitatively into pure zirconium oxide by steaming at 300 to 500° C. for one hour and calcining at 700 to 1000° C. for 2½ hours.

*Example 5*

A solid addition compound having the formula $ZrCl_4 \cdot 2C_2H_5OC_2H_5$ was prepared by reacting solid zirconium tetrachloride and diethyl ether at approximately room temperature. This addition compound was decomposed by heating for several hours at a temperature of about 270° C. to give diethyl ether, ethyl chloride and zirconium compound polymers, containing chlorine and alkoxy groups.

*Example 6*

A solid addition compound having the formula $ZrCl_4 \cdot 2C_3H_7OC_3H_7$ was prepared by reacting solid zirconium tetrachloride and dipropyl ether at approximately room temperature. This addition compound was decomposed by heating for several hours at a temperature of about 250° C. to give dipropyl ether, propyl chloride, some gaseous products and zirconium compound polymers containing chlorine and alkoxy groups.

In a further development it has been found that alkyl chlorides and similar zirconium compound polymers containing chlorine and alkoxy groups can be produced by reacting zirconium tetrachloride with liquid alcohols. It is already known that zirconium tetrachloride dissolves in alcohol with the partial substitution of the chlorine atoms by alkoxy groups and that when the excess alcohol has been driven off (at a temperature above the distillation temperature of the alcohol) a mixture of compounds of the type $ZrCl_2(OR)_2$ and $ZrCl_3OR \cdot ROH$ will result.

It has now been found that such compounds will result in zirconium compound polymers containing chlorine and alkoxy groups as well as alkyl chlorides if they are heated between 150 and 400° C. and preferably between 180 and 250° C. for between 1 and 40 hours. Among alcohols primarily suitable for the performance of the invention are the lower aliphatic alcohols having between 1 to 3 carbon atoms. This thermal decomposition of an intermediate product is very similar to the decomposition procedures described with regard to the previously described embodiment of this invention. It offers the possibility of varying the conditions of decomposition so as to give a wide variety of zirconium compound polymers having different properties. The zirconium compound polymers may be converted to pure zirconium oxide by steaming at 300–500° C. and then calcining at 800–1000° C. The following example will serve to illustrate.

*Example 7*

281 parts by weight of $ZrCl_4$ were dissolved in 1040 parts by weight of methanol. After the excess methanol was distilled off, with the aid of vacuum, 272 parts by weight of a white residue remained. 50 parts by weight of this solid substance was decomposed at temperatures between about 180 and 250° C. A vigorous current of methyl chloride was evolved. After separating a little dimethyl ether, 13 parts by weight of methyl chloride were isolated. The residue consisted of 32.5 parts by weight of zirconium compound polymers containing chlorine and methoxy-groups, which were subsequently converted into pure zirconium oxide by treatment with steam at about 300 to 500° C. followed by calcination at temperatures up to about 1000° C.

While I have described what I consider to be the most advantageous embodiments of my invention, it is of course evident that numerous modifications can be made in the specific procedures which have been described without departing from the purview of this invention.

What is claimed is:

1. A process for preparing highly purified zirconium oxide which comprises reacting zirconium tetrachloride with an unsubstituted aliphatic ether having at least two and not more than six carbon atoms to fom an intermediate reaction product $ZrCl_4 \cdot 2ROR'$, wherein R and R' are similar or different alkyl groups having one to three carbon atoms, thereafter heating said intermediate reaction product at a temperature within the range of about 100 to 300° C. and for a time ranging between about 1 hour and 40 hours to produce decomposition products comprising a corresponding unsubstituted aliphatic ether at least one chloride of the above-recited alkyl groups and zirconium compound polymers containing at least one radical selected from the group consisting of Cl, OR and OR', wherein R and R' are alkyl groups having between one and three carbon atoms, and then converting the said zirconium compound polymers to zirconium oxide of high purity by steaming at a temperature within the range of about 300–500° C. and then calcining at a temperature between about 800 and 1000° C.

2. The process according to claim 1 wherein said aliphatic ether is dimethyl ether.

3. The process according to claim 1 wherein said aliphatic ether is ethyl methyl ether.

4. The process according to claim 1 wherein said intermediate reaction product is formed by reacting the zirconium tetrachloride and the aliphatic ether at approximately room temperatures.

5. The process which comprises autoclaving zirconium tetrachloride and an unsubstituted aliphatic ether having at least two and not more than six carbon atoms according to claim 1 at a temperature between 80 and 300° C. and at a pressure between about 1 atmosphere and 200 atmospheres and recovering the same products which are set forth in claim 1.

6. The process according to claim 5 wherein said aliphatic ether is dimethyl ether.

References Cited in the file of this patent

UNITED STATES PATENTS

| | | |
|---|---|---|
| 2,467,177 | Zimmer | Apr. 12, 1949 |
| 2,682,531 | Ernst | June 29, 1954 |

OTHER REFERENCES

Blumenthal: "Industrial and Engineering Chem.," 46 (1954), pages 528–539.

Sidgwick: "Chemical Elements and Their Compounds," vol. 1, p. 641, 1950, Oxford University Press.

Hummers et al.: "J.A.C.S.," 74, 139–41 (1952).